US011589580B2

(12) United States Patent
Swietoslawski et al.

(10) Patent No.: US 11,589,580 B2
(45) Date of Patent: Feb. 28, 2023

(54) PESTICIDE FORMULATIONS HAVING PHYSICAL MODE OF ACTION

(71) Applicant: ICB PHARMA, Jaworzno (PL)

(72) Inventors: Janusz Swietoslawski, Jaworzno (PL); Wojciech Wieczorek, Czechowice-Dziedzice (PL); Dawid Liszka, Jaworzno (PL)

(73) Assignee: ICB PHARMA, Jaworzno (PL)

( * ) Notice: Subject to any disclaimer, the term of this patent is extended or adjusted under 35 U.S.C. 154(b) by 0 days.

(21) Appl. No.: 15/518,906

(22) PCT Filed: Oct. 14, 2015

(86) PCT No.: PCT/US2015/055578
§ 371 (c)(1),
(2) Date: Apr. 13, 2017

(87) PCT Pub. No.: WO2016/061259
PCT Pub. Date: Apr. 21, 2016

(65) Prior Publication Data
US 2017/0238537 A1 Aug. 24, 2017

Related U.S. Application Data

(60) Provisional application No. 62/063,504, filed on Oct. 14, 2014.

(51) Int. Cl.
| *A01N 25/30* | (2006.01) |
| *A01N 25/28* | (2006.01) |
| *A01N 53/00* | (2006.01) |
| *A01N 25/04* | (2006.01) |
| *A01N 43/30* | (2006.01) |
| *A01N 47/40* | (2006.01) |

(52) U.S. Cl.
CPC .............. *A01N 25/30* (2013.01); *A01N 25/04* (2013.01); *A01N 25/28* (2013.01); *A01N 43/30* (2013.01); *A01N 47/40* (2013.01); *A01N 53/00* (2013.01)

(58) Field of Classification Search
CPC ........ A01N 25/04; A01N 25/28; A01N 25/30; A01N 43/30; A01N 47/40; A01N 53/00; A01N 47/02; A01N 43/16; A01N 43/40; A01N 43/56; A01N 43/90; A01N 47/06; A01N 47/18; A01N 51/00; C01B 33/16; C01B 33/166; A61K 9/5115
USPC .......................................... 514/507; 524/507
See application file for complete search history.

(56) References Cited

U.S. PATENT DOCUMENTS

| 5,015,630 A * | 5/1991 | Fisher .................... C07H 19/01 514/30 |
| 5,658,852 A * | 8/1997 | Murphy ................. A01N 25/30 504/362 |
| 5,968,872 A * | 10/1999 | Policello ............... C09K 17/38 424/405 |
| 7,807,717 B2 | 10/2010 | Newman |
| 8,067,478 B1 * | 11/2011 | Meador ................. C08F 230/08 521/154 |
| 8,734,821 B2 * | 5/2014 | Hollis .................... A01N 25/30 424/406 |
| 9,567,353 B2 * | 2/2017 | Warren ................. C07F 7/1836 |
| 2007/0266750 A1 | 11/2007 | Hollis et al. |
| 2012/0237676 A1 | 9/2012 | Kalyankar et al. |

FOREIGN PATENT DOCUMENTS

| CN | 104222167 A | 12/2014 |
| EP | 0 791 384 B1 | 1/2003 |
| EP | 1352563 | 10/2003 |

OTHER PUBLICATIONS

International Search Report, PCT/US2015/055578, dated Feb. 9, 2016, 6 pages.
English Abstract for CN 104222167, 2 pages.
C.J. Brinker, "Hydrolysis and Condensation of Silicates: Effects on Structure", Journal of Non-Crystalline Solids, vol. 100, pp. 31-50, 1988.
G. Vani Padmaja, "Preparation of Orthosilicic Acid by Sol-Gel Technique Using Tetraethyl Orthosilicic Acid (TEOS) and its Applications", International Journal of Scientific and Research Publications, vol. 5, Issue 8, Aug. 2015, (10 pages).
Fausto Rubio, et al., "A FT-IR study of the hydrolysis of Tetraethylorthoselicate (TEOS)", Spectroscopy Letters, vol. 31, pp. 199-219, 1998.

* cited by examiner

*Primary Examiner* — Kyle A Purdy
(74) *Attorney, Agent, or Firm* — Ware, Fressola, Maguire & Barber LLP

(57) ABSTRACT

The invention relates to pesticidal compositions comprising trisiloxane surfactants and a matrix-forming agent, which compositions are capable of controlling pests and pathogens using a physical mode of action. Accordingly, in one aspect, the present disclosure provides a pesticidal composition for controlling pests and pathogens with a physical mode of action. The composition comprises trisiloxane surfactants and matrix-forming agents. The composition may form a gel matrix or a film matrix. The trisiloxane surfactants may be selected from the group consisting of Silwet L-77, Silwet 408, Break-Thru S-240, and Silibase 2848. The matrixforming agents of a pesticidal composition are selected from the group consisting of chitosan salts and sol-gel precursors.

11 Claims, No Drawings

PESTICIDE FORMULATIONS HAVING PHYSICAL MODE OF ACTION

CROSS-REFERENCE TO RELATED APPLICATION

This application relates to and claims the priority of U.S. Provisional Patent Application Ser. No. 62/063,504, which was filed Oct. 14, 2014 and is hereby incorporated by reference in its entirety.

FIELD OF THE INVENTION

The present invention relates to compositions capable of controlling pests and pathogens with a physical mode of action.

BACKGROUND OF THE INVENTION

Agricultural losses are primarily caused by insect pest damage and plant pathogens. Insects may also act as vectors of bacterial or viral plant pathogens where controlling the insect vector is the only means of preventing infection. Insect and pathogen induced spoilage of agricultural commodities, such as fruits and vegetables, has been estimated to result in losses of approximately 30% of crops in the United States and up to 50% of crops worldwide. Thus, effective agricultural practices to control insect pests and pathogens are essential to prevent excessive crop losses.

However, using chemical pesticides on plants and animals may cause acute and chronic toxicity, carcinogenicity, and other negative effects on the humans and animals that come into contact with them. Humans and animals who consume produce that has been treated with or has come in contact with conventional pesticides, as well those humans and animals who are exposed to the environmental conditions the pesticides leave behind, are at risk. Additionally, strains of pesticide resistant insects are increasing at alarming rates, rendering chemical treatments less, or even completely ineffective for agricultural purposes.

Accordingly, there is a need in the art for new methods of controlling pests, including insects that destroy agricultural commodities and infest animals, which methods are effective, safer to humans, and environmentally benign.

SUMMARY OF THE INVENTION

Accordingly, in one aspect, the present disclosure provides a pesticidal composition for controlling pests and pathogens with a physical mode of action. The composition comprises trisiloxane surfactants and matrix-forming agents. The composition may form a gel matrix or a film matrix. The trisiloxane surfactants may be selected from the group consisting of Silwet L-77, Silwet 408, Break-Thru S-240, and Silibase 2848. The matrix-forming agents of a pesticidal composition are selected from the group consisting of chitosan salts and sol-gel precursors.

When the matrix-forming agents are sol-gel precursors, the trisiloxane surfactants are present in an amount of about 95% to about 99.9% (wt/wt) and the sol-gel precursors are present in an amount of about 0.1% to about 5% (wt/wt). The sol-gel precursor may be tetraethyl orthosilicate. When the sol-gel precursor is tetraethyl orthosilicate the composition may comprise trisiloxane surfactants are present in an amount of about 99% (wt/wt), and tetraethyl orthosilicate is present in an amount of about 1% (wt/wt).

When the matrix-forming agents are chitosan salts, the chitosan salts have a molecular weight of about 47 kDa and a degree of deacetylation of about 88%. Compositions comprising chitosan salts may comprise trisiloxane surfactants in an amount of about 10% to about 90% (wt/wt), and chitosan salts in an amount of about 10% to about 90% (wt/wt). The chitosan salts may be selected from the group consisting of chitosan propionate, chitosan hydrochloride, chitosan phosphate, chitosan phosphonate, chitosan acetate, and chitosan citrate, preferably chitosan propionate or chitosan citrate. Compositions comprising trisiloxane surfactants and chitosan salts may comprise trisiloxane surfactant in an amount of about 25% (wt/wt), and chitosan salts in an amount of about 15% (wt/wt). Alternatively, compositions may comprise trisiloxane surfactant in an amount of about 25% (wt/wt), and chitosans in an amount of about 25% (wt/wt). Compositions comprising trisiloxane surfactants and chitosan salts may further comprise a sufficient amount of acid to generate compositions having a pH of 6.2 or lower. The acid may be acetic acid.

Compositions of the present disclosure may further comprise an insecticide synergist such as piperonyl butoxide. Compositions may also further comprise a pesticide.

In another aspect, the present disclosure provides a pesticidal composition for controlling pests and pathogens with a physical mode of action comprising at least one trisiloxane surfactant and at least one sol-gel precursor. The at least one trisiloxane surfactant may be present in an amount of about 95% to about 99.9% (wt/wt), and the at least one sol-gel precursor may be present in an amount of about 0.1% to about 5% (wt/wt).

In yet another aspect, the present disclosure provides a pesticidal composition for controlling pests and pathogens with a physical mode of action comprising at least one trisiloxane surfactant and at least one chitosan salt. The at least one trisiloxane surfactant may be present in an amount of about 20% to about 30%, and the at least one chitosan salt may be present in an amount of about 20% to about 30%. Alternatively, the at least one trisiloxane surfactant may be present in an amount of about 20% to about 30%, and the at least one chitosan salt may be present in an amount of about 10% to about 20%.

A further aspect of the present disclosure provides a pesticidal composition for controlling pests and pathogens with a physical mode of action comprising about 99% (wt/wt) silibase 2848 trisiloxane surfactant and about 1% (wt/wt) tetraethyl orthosilicate matrix-forming agent.

Another aspect of the present disclosure provides a pesticidal composition for controlling pests and pathogens with a physical mode of action comprising about 90% (wt/wt) silibase 2848 trisiloxane surfactant, about 1% (wt/wt) tetraethyl orthosilicate matrix-forming agent, and about 10% piperonyl butoxide.

An additional aspect of the present disclosure provides a pesticidal composition for controlling pests and pathogens with a physical mode of action comprising about 25% (wt/wt) Break-Thru S240, about 15% (wt/wt) chitosan acetate, about 15% acetic acid, and about 45% (wt/wt) dipropylene glycol methyl ether.

Another aspect of the present disclosure provides a pesticidal composition for controlling pests and pathogens with a physical mode of action comprising about 25% (wt/wt) Silwet L-77, about 25% (wt/wt) chitosan propionate, about 41% citric acid, and about 9% (wt/wt) Tixosil 38A silica.

Yet another further aspect of the present disclosure provides a pesticidal composition for controlling pests and pathogens with a physical mode of action comprising about 25% (wt/wt) Silwet L-77, about 25% (wt/wt) chitosan propionate, about 41% citric acid, and about 9% (wt/wt) Tixosil 38A silica.

A further aspect of the present disclosure provides a method of controlling a pest or a pathogen, the method comprising applying a pesticidal composition having a physical pesticidal mode of action to a pest or a locus. The composition comprises trisiloxane surfactants and matrix-forming agents.

Another aspect of the present disclosure provides a method of killing a pest, the method comprising applying a pesticidal composition having a physical pesticidal mode of action to a pest. The composition comprises trisiloxane surfactants and matrix-forming agents.

Yet another aspect of the present disclosure provides a method of inducing resistance against a pathogen, the method comprising applying a pesticidal composition having a physical pesticidal mode of action to a pest or a locus. The composition comprises trisiloxane surfactants and matrix-forming agents.

A further aspect of the present disclosure provides a method of preparing an emulsifiable concentrate formulation of a pesticidal composition comprising trisiloxane surfactants and sol-gel precursors, the method comprising combining the trisiloxane surfactants and the sol-gel precursors to generate an emulsifiable concentrate.

An additional aspect of the present disclosure provides a method of preparing an oil-in-water emulsifiable concentrate formulation of a pesticidal composition comprising trisiloxane surfactants and chitosan salts. The method comprises dispersing the chitosan salts in a solvent; adding an acid and mixing for about 10 minutes; and adding the trisiloxane surfactant to generate a dispersion.

Another aspect of the present disclosure provides a method of preparing a soluble powder formulation of a pesticidal composition comprising trisiloxane surfactants and chitosan salts, the method comprising combining the trisiloxane surfactants, the chitosan salts, an acid, and an anti-caking agent to generate a soluble powder formulation.

A further aspect of the present disclosure provides a method of applying a formulation of a pesticidal composition comprising trisiloxane surfactants and matrix-forming agents, the method comprising diluting the formulation in water to generate a diluted pesticidal composition comprising about 0.01 to about 4% (wt/wt) trisiloxane surfactant, and applying the diluted composition to a surface.

DETAILED DESCRIPTION

The present invention provides pesticidal compositions capable of controlling pests and pathogens using a physical mode of action. Compositions of the present disclosure comprise trisiloxane surfactants and matrix-forming agents, and are capable of forming a lasting matrix. It was surprisingly discovered by the inventors that a matrix formed by compositions comprising trisiloxane surfactants can effectively control a wide variety of fungi, viruses, bacteria, mites, insects, and nematodes. Advantageously, compositions of the present disclosure are safe for workers, consumers, and the environment, and are effective in controlling pests and pathogens without the need for conventional pesticides having a chemical mode of action. Methods of preparing and administering compositions of the disclosure are also described. Various aspects of the invention are described in further detail in the following sections.

I. Compositions

One aspect of the present invention provides compositions comprising a trisiloxane surfactant and a matrix-forming agent. The term "matrix" as used herein, describes any structure formed by the dispersion of a composition of the present disclosure on a surface. Non-limiting examples of a matrix formed by a composition of the present disclosure include a gel, a film, or a fiber. While not wishing to be bound by theory, it is believed that trisiloxane surfactants and matrix-forming agents, when combined in compositions of the present disclosure and applied on a surface such as a pest, control pests using a physical mode of action by spreading rapidly over a pest's body, infiltrating the tracheal system and forming a lasting matrix capable of effectively suffocating the pest. It is also believed that compositions of the present disclosure can form a lasting matrix on a surface such as a leaf, thereby physically protecting the leaf from further infestation by pests, or inducing resistance against fungi, viruses, and bacteria.

a. Trisiloxane Surfactants

Surfactants (alternatively referred to as a "surface acting agents" or "detergents") are compounds that reduce surface tension (or interfacial tension) when dissolved in water or water solutions, or that reduce surface tension between two liquids or between a liquid and a solid. For instance, in a spray composition, surfactants enhance the spreading of spray droplets on a surface such as on a leaf or on an insect.

Presently described compositions comprise a trisiloxane surfactant comprising Formula (I):

$$\text{H}_3\text{C}-\underset{\underset{\text{CH}_3}{|}}{\overset{\overset{\text{CH}_3}{|}}{\text{Si}}}-\text{O}-\underset{\underset{\text{R}}{|}}{\overset{\overset{\text{CH}_3}{|}}{\text{Si}}}-\text{O}-\underset{\underset{\text{CH}_3}{|}}{\overset{\overset{\text{CH}_3}{|}}{\text{Si}}}-\text{CH}_3 \quad (\text{I})$$

wherein
R is —$(CH_2)_3$—$(OCH_2CH_2)nOR_1$;
$R_1$ is —H, —$CH_3$, or —O(O)$CCH_3$; and
n is 2 to 20.

Trisiloxane surfactants are especially effective at reducing the surface tension of water, thereby allowing a drop of a composition comprising trisiloxane surfactants to spread to a diameter at least 9 times as great as a doubly-distilled drop of water on a hydrophobic surface such as the leaf of a plant.

Presently described compositions comprise at least one trisiloxane surfactant. For instance, a composition may comprise 1, 2, 3, 4, 5, 6, 7, 8 9, 10 or more trisiloxane surfactants. Preferably, a composition comprises 1, 2, 3, or 4, trisiloxane surfactants. More preferably, a composition comprises one trisiloxane surfactant.

Trisiloxane surfactants are commercially available from a variety of sources. Non-limiting examples of commercially available trisiloxane surfactants suitable for use in a composition of the present disclosure include Silwet L-77®, SILWET 408®, SILWET Y-12808®, SILWET L-7607®, SILWET L-7602®, SILWET L-7210®, SILWET L-7002®, SILWET L-720®, and SILWET L-7200® (all of which are registered trademarks of OSi Specialties), Break-Thru S-240® (a registered trademark of Evonik Industries), Sylgard 309® (a registered trademark of Dow Corning Corporation), and Silibase 2848. Preferred commercially available trisiloxane surfactants are Silwet L-77®, Silwet 408®, Break-Thru S-240®, and Silibase 2848.

b. Matrix-Forming Compositions

Trisiloxane surfactants are capable of forming a lasting matrix when combined with a matrix-forming agent and applied to a surface. As used herein, the term "lasting" describes the duration of time that a composition of the present disclosure may be capable in controlling a pest or pathogen. For instance, a lasting matrix may be capable of controlling pests or pathogens for 1, 2, 3, 4, 5, 6, 7, 8, 9, 10, 15, 20, or 30 days after application or longer.

The term "matrix-forming agent" as used herein, describes any agent capable of reacting or interacting with itself or with a trisiloxane surfactant of the composition to form a hybrid material with altered physical properties when compared to the individual components alone. Preferred matrix-forming agents may be sol-gel precursors capable of forming a gel matrix in a composition comprising trisiloxanes. Other preferred matrix-forming agents may be chitosan salts capable of forming a film matrix in a composition comprising trisiloxanes. Compositions comprising each matrix-forming agent are described in more detail below.

A. Compositions Comprising Trisiloxanes and Sol-Gel Precursors

Preferably, matrix-forming agents may be sol-gel precursors. The sol-gel process may be described as the polycondensation reactions of one or more siloxane molecular precursors (e.g. trisiloxane surfactants and sol-gel precursors) in a liquid leading to the formation of a 1-, 2-, or 3-dimensional network or gel matrix of siloxane bonds. As it was discovered by the inventors, trisiloxane surfactants may be capable of forming a gel matrix by the sol-gel process when combined with sol-gel precursors.

Presently described compositions may comprise a single sol-gel precursor or a mixture of sol-gel precursors. For instance, a composition may comprise 1, 2, 3, 4, 5, 6, 7, 8 9, 10 or more sol-gel precursors. Preferably, a composition comprises 1, 2, 3, or 4 sol-gel precursors. More preferably, a composition comprises one sol-gel precursor.

Sol-gel precursors suitable for the purposes of the invention are known in the art. Precursors used in sol-gel processing consist of a metal or metalloid element such as silicon, boron, aluminium, titanium, zinc, and zirconium, surrounded by various reactive ligands. Preferably, a sol-gel precursor of the present disclosure is a metal alkoxide. More preferably, a metal alkoxide sol-gel precursor is a silicon alkoxide. When a silicon alkoxide precursor is used in a sol-gel process, a number of reactions result, including hydrolysis, which leads to the formation of silanol groups Si—OH, and condensation, which gives siloxane Si—O—Si groups. Non-limiting examples of silicon alkoxide sol-gel precursors include $Si(OC_2H_5)_4$ (tetraethyl orthosilicate or TEOS) or $Si(OCH_3)_4$ (tetramethyl orthosilicate or TMOS). A preferred sol-gel precursor suitable for use in a composition of the present disclosure is TEOS.

Desired physical and performance characteristics of a sol-gel matrix resulting from a composition comprising trisiloxane surfactants and sol-gel precursors can and will vary depending in part on the trisiloxane surfactants and sol-gel precursors used in a composition, the number of and the relative amounts of trisiloxane surfactants and precursors in a composition, and the compositions, and may be determined experimentally.

Presently described compositions comprising trisiloxane surfactants and sol-gel precursors may be formulated as described in Section II for application to a pest or pathogen or a locus of pest or pathogen. Preferably, compositions comprising trisiloxane surfactants and sol-gel precursors are formulated as an emulsifiable concentrate (EC). An EC formulation comprising trisiloxane surfactants and sol-gel precursors of the present disclosure may be prepared by combining the trisiloxane surfactants and sol-gel precursors to form an EC formulation. An EC formulation of the present disclosure may comprise about 0.1, 1, 2, 5, 10, 20, 30, 40, 50, 60, 70, 80, 85, 90, 95, or about 99% (wt/wt) or more trisiloxane surfactants. Preferably, EC formulations may comprise about 90, 95, 96, 97, 98, 99% (wt/wt) or more trisiloxane surfactants. More preferred are formulations comprising about 98, 98.1, 98.2, 98.3, 98.4, 98.5, 98.6, 98.7, 98.8, 98.9, 99, 99.1, 99.1, 99.3, 99.4, 99.5, 99.6, 99.7, 99.8, or 99.9% (wt/wt) or more trisiloxane surfactants.

An EC formulation comprising trisiloxane surfactants and sol-gel precursors of the present disclosure may comprise about 0.1, 1, 2, 5, 10, 15, 20, 25, 30, 40, 50, 60, 70, 80, or about 90% (wt/wt) or more sol-gel precursors. Preferably, compositions may comprise about 0.1, 1, 2, or 5% (wt/wt) sol-gel precursors. More preferred are compositions comprising about 0.1, 0.2, 0.3, 0.4, 0.5, 0.6, 0.7, 0.8, 0.9, 1, 1.1, 1.2, 1.3, 1.4, 1.5, 1.6, 0.7, 1.8, 1.9 or about 2% (wt/wt) sol-gel precursors.

An EC formulation may further comprise an insecticide synergist. An insecticide synergist may be as described in Section IIc below. Preferably, when an EC formulation of the present disclosure further comprises an insecticide synergist, the synergist is piperonyl butoxide (PBO). An EC formulation comprising trisiloxane surfactants and sol-gel precursors and further comprising about 5, 6, 7, 8, 9, 10, 11, 12, 13, 14, 15, 16, 17, 18, 19, or about 20% (wt/wt) or more PBO, preferably about 5, 6, 7, 8, 9, 10, 11, 12, 13, 14, or about 15% (wt/wt) PBO, and more preferably about 8, 9, 10, 11, or about 12% (wt/wt) PBO.

In general, an EC formulation is diluted in water before using to control microorganisms and invertebrate pests. An EC formulation of a presently described composition may be diluted in water to generate a formulation comprising about 0.01 to about 3% (wt/wt) trisiloxane surfactant, preferably 0.1 to about 1% (wt/wt) trisiloxane surfactant, and more preferably, 0.125 to about 0.175% (wt/wt) trisiloxane surfactant.

B. Compositions Comprising Trisiloxanes and Chitosans

Also preferably, the matrix-forming agent may be chitosan salts. Chitosans are linear polysaccharides composed of randomly distributed β-(1-4)-linked D-glucosamine (deacetylated unit) and N-acetyl-D-glucosamine (acetylated unit) having the following chemical structure.

While not wishing to be bound by theory, it is believed that chitosan salts when combined with a trisiloxane surfactant in a presently described composition may form a film matrix wherein the film formation process involves the rapid spreading of chitosan salts, and coalescence of the chitosan polymeric particles, during and after the evaporation of diluents, thereby permitting contact and fusion of adjacent chitosan polymeric particles.

Chitosans are highly basic polysaccharides with unique properties like the ability to form films, to react with polyanions, and to chelate metal ions. Chitosans are produced by deacetylation of chitin, which is the structural element in the exoskeleton of crustaceans (such as crabs and shrimp) and cell walls of fungi. The degree of deacetylation (% DDA) and molecular weight (MW) of chitosans are important factors that have an impact on properties such as solubility and biological activity of a chitosan. For instance, chitosans with high molecular weights (1 million kDa or more) or chitosans with a low % DDA are poorly soluble, whereas chitosans with molecular weights lower than 1 million kDa and/or chitosans with a high % DDA have improved solubility. The solubility of chitosan may also be adjusted over a wide pH range in water by means of simple chemical reactions such as carboxymethylation to O-CM-chitosan, N-CM-chitosan and/or N/O-CM-chitosan. For details of this basic knowledge about chitosan, cf. e.g. the publication entitled "Applications of Chitin and Chitosan", Goosen, Mattheus F. A. (Ed.), Lancaster: Technomic Publishing Company, 1996, chapter 1 entitled "Applications and Properties of Chitosan", Q. Li et al., pages 3 to 29, particularly pages 8 and 9. As such, multiple types of chitosans having different chemical and physical properties may be generated by varying the % DDA, molecular weight, or by substitution of side groups.

Chitosan salts of the present disclosure may have a molecular weight ranging between 1-1000 kDa. Preferably, chitosan salts have a molecular weight ranging between 1-500 kDa. More preferred are chitosan salts having a molecular weight ranging between 1-100 kDa. For instance, chitosan salts of the present disclosure may have a molecular weight of about 5, 10, 20, 30, 40, 50, 60, 70, 80, 90 or 100 kDa. Preferably, chitosan salts of the present disclosure have a molecular weight ranging from about 40 to about 60 kDa. More preferably, chitosan salts of the present disclosure may a molecular weight ranging from about 40 to about 50 kDa. For instance, a chitosan salt that may be appropriate to use in a composition of the present disclosure may have a molecular weight of about 47 kDa.

Chitosan salts of the present disclosure may also have a % DDA of about 50, 55, 60, 65, 70, 75, 80, 85, 90, 95% or more. Preferably, chitosan salts have a % DDA of about 60, 65, 70, 75, 80, 85, 90, 95, or 100%. More preferred are chitosan salts having a % DDA of about 65, 70, 75, 80, 85, 90, 95, or 99%. Even more preferred are chitosan salts having a % DDA ranging from about 80 to about 90% DDA. For instance, a chitosan salt that may be appropriate to use in a composition of the present disclosure may have a % DDA of about 88%.

Chitosans are insoluble in water, organic solvents and aqueous bases but can be solubilized after stirring in acids. The amino groups in chitosan have a pKa value of about 6.5, and are completely protonated in acids with pKa smaller than 6.2, thereby making chitosans soluble. As such, compositions comprising trisiloxane surfactants and chitosan salts may further comprise organic or inorganic acids. Preferably, compositions comprising trisiloxane surfactants and chitosan salts further comprise a sufficient amount of acid to generate compositions having a pH of 6.2 or lower. Non-limiting examples of acids with pKa smaller than 6.2 that may be used in a composition of the present disclosure include acetic, citric, hydrochloric, propionic, phosphonic, and phosphoric.

When compositions comprising trisiloxane surfactants and chitosan salts further comprise acids, acids may be combined with a composition to generate a mixture of trisiloxane surfactants, chitosan salts, and acids. Alternatively, compositions comprising trisiloxane surfactants and chitosan salts may be first generated, and acids are added during formulation of the composition for application.

Compositions may comprise a single type of chitosan salt or a mixture of chitosan salts. For instance, a composition may comprise 1, 2, 3, 4, 5, 6, 7, 8 9, 10 or more types of chitosan salts. Preferably, a composition comprises 1, 2, 3, or 4 types of chitosan salts. More preferably, a composition comprises one type of chitosan salt. Non-limiting examples of chitosan salts include chitosan propionate, chitosan hydrochloride, chitosan phosphate, chitosan phosphonate, chitosan acetate, and chitosan citrate.

As described above for compositions comprising trisiloxane surfactants and sol-gel precursors, desired physical and performance characteristics of a matrix resulting from a composition comprising trisiloxane surfactants and chitosan salts can and will vary depending in part on the trisiloxane surfactants, the degree of deacetylation (% DDA) and molecular weight (MW) of chitosan salts used in a composition, the number of trisiloxane surfactants and types of chitosan salts in a composition, the relative amounts of trisiloxane surfactants and chitosan salts in a composition, and the reaction conditions used in preparing such compositions, and may be determined experimentally.

A composition comprising trisiloxane surfactants and chitosan salts of the present disclosure may comprise about 0.1, 1, 2, 5, 10, 20, 30, 40, 50, 60, 70, 80, 85, 90, or about 95% (wt/wt) or more trisiloxane surfactants. Preferably, a composition comprises about 10, 20, 30, 40, or about 50% (wt/wt) trisiloxane surfactants. More preferred are compositions comprising about 15, 16, 17, 18, 19, 20, 21, 22, 23, 24, 25, 26, 27, 28, 29, 30, 31, 32, 33, 34, or about 35% (wt/wt) trisiloxane surfactants.

A composition comprising trisiloxane surfactants and chitosan salts of the present disclosure may comprise about 0.1, 1, 2, 5, 10, 20, 30, 40, 50, 60, 70, 80, 85, 90, or about 95% (wt/wt) or more chitosan salts. Preferably, compositions comprise about 1, 2, 5, 10, 20, 30, or about 40% (wt/wt) chitosan salts. More preferred are compositions comprising about 5, 10, 15, 20, 25, 30, 35, or about 40% (wt/wt) chitosan salts. Even more preferred are compositions comprising about 10, 11, 12, 13, 14, 15, 16, 17, 18, 19, or about 20% (wt/wt) chitosan salts. Also more preferred are compositions comprising about 15, 16, 17, 18, 19, 20, 21, 22, 23, 24, 25, 26, 27, 28, 29, 30, 31, 32, 33, 34, or about 35% (wt/wt) chitosan salts.

Compositions comprising trisiloxane surfactants and chitosan salts of the present disclosure may further comprise an acid. For instance, compositions may comprise about 1, 2, 5, 10, 20, 30, 40, 50, or about 60% (wt/wt) acid. More preferred are compositions comprising about 10, 11, 12, 13, 14, 15, 16, 17, 18, 19, or about 20% (wt/wt) acid. Other more preferred compositions comprise about 30, 31, 32, 33, 34, 35, 36, 37, 38, 39, 40, 41, 42, 43, 44, 45, 46, 47, 48, 49, or about 50% (wt/wt) acid. Preferred acids include acetic acid, propionic acid, and citric acid.

Presently described compositions comprising trisiloxane surfactants and chitosan salts may be formulated as described in Section II for application to a pest or pathogen or a locus of pest or pathogen. Preferably, compositions comprising trisiloxane surfactants and chitosan salts are formulated as an oil-in-water emulsifiable concentrate (EW; also known as an oil dispersion (OD)). An EW formulation comprising trisiloxane surfactants and chitosan salts of the present disclosure preferably comprises about 15, 16, 17, 18, 19, 20, 21, 22, 23, 24, 25, 26, 27, 28, 29, 30, 31, 32, 33, 34, or about 35% (wt/wt) trisiloxane surfactants, about 10, 11, 12, 13, 14, 15, 16, 17, 18, 19, or about 20% (wt/wt) chitosan salts, and about 10, 11, 12, 13, 14, 15, 16, 17, 18, 19, or about 20% (wt/wt) acetic acid.

An EW formulation comprising trisiloxane surfactants and chitosan salts of the present disclosure may be prepared by dissolving a composition of the disclosure in an organic solvent. A preferred organic solvent is dipropylene glycol methyl ether. For instance, a composition may be dissolved in about 10, 20, 30, 40, 50, 60, or about 70% (wt/wt) dipropylene glycol methyl ether, more preferably about 40, 41, 42, 43, 45, 46, 47, 48, 49, or about 50% (wt/wt) dipropylene glycol methyl ether. Preferably, compositions comprising trisiloxane surfactants and chitosan salts are formulated as an EW as described in Example 3.

In general, an EW formulation is diluted in water before application of the formulation to control microorganisms and invertebrate pests. An EW formulation of a presently described composition may be diluted in water to generate a formulation comprising about 0.01 to about 3% (wt/wt) trisiloxane surfactant, preferably 0.05 to about 0.15% (wt/wt) trisiloxane surfactant. Preferably, the water is acidified with acid to a pH of about 3 to about 4. More preferably, the water is acidified with acetic acid to a pH of about 3 to about 4.

Also preferably, compositions comprising trisiloxane surfactants and chitosan salts are formulated as soluble powder (SP) formulations. An SP formulation comprising trisiloxane surfactants and chitosan salts of the present disclosure preferably comprises about 20, 21, 22, 23, 24, 25, 26, 27, 28, 29, or about 30% (wt/wt) trisiloxane surfactants, about 20, 21, 22, 23, 24, 25, 26, 27, 28, 29, or about 30% (wt/wt) chitosan salts, and about 35, 36, 37, 38, 39, 40, 41, 42, 43, 44, or about 45% (wt/wt) citric acid. Alternatively, an SP formulation comprising trisiloxane surfactants and chitosan salts of the present disclosure preferably comprises about 20, 21, 22, 23, 24, 25, 26, 27, 28, 29, or about 30% (wt/wt) trisiloxane surfactants, about 20, 21, 22, 23, 24, 25, 26, 27, 28, 29, or about 30% (wt/wt) chitosan salts, and about 10, 11, 12, 13, 14, 15, 16, 17, 18, 19, or about 20% (wt/wt) propionic acid.

An SP formulation comprising trisiloxane surfactants and chitosan salts of the present disclosure may be prepared by combining components of a composition of the disclosure with an anti-caking agent. A preferred anti-caking agent is Tixosil® 38A silica. Preferably, compositions comprising trisiloxane surfactants and chitosan salts are formulated as an SP as described in Example 4.

An SP formulation is generally diluted in water before application to control microorganisms and invertebrate pests. Preferably, an SP formulation is first combined with water at a ratio of about 1:5 to about 1:15 SP:water for a sufficient amount of time to dissolve components of formulation and formation of a gel. For instance, an SP formulation is first combined with water at a ratio of about 1:5 to about 1:15 SP:water for about 1, 2, 3, 4, 5, 6, 7, 8, 9, or about 10 minutes. A solubilized SP formulation may then be further diluted in water to generate a formulation comprising about 0.01 to about 4% (wt/wt) trisiloxane surfactant, preferably 0.1 to about 2% (wt/wt) trisiloxane surfactant.

II. Method of Use

The present disclosure provides a method of controlling pests and pathogens which comprises applying an effective amount of a composition of the present disclosure to a pest or pathogen or a locus of pest or pathogen. The term "locus of pest or pathogen" as used herein may be used to describe any surface that may be infested with a pest or pathogen, a surface susceptible to attack by a pest or pathogen, or a surface where a pest or pathogen may be found. For instance, a locus of pest or pathogen may be a leaf, the body of a mammal or bird, or a man-made structure.

a. Control of Pests and Pathogens

Compositions of the present disclosure may be used to control infestations of microorganisms and invertebrate pests. Preferably, compositions are used to control infestations of microorganisms. As used herein, the term "microorganisms" may be used to describe bacterial, viral and fungal microorganisms. Also preferably, compositions are used to control infestations of invertebrate pests. As used herein, the term "invertebrate pests" may be used to describe insect pests such as Lepidoptera, Diptera, Hemiptera, Thysanoptera, Orthoptera, Dictyoptera, Coleoptera, Siphonaptera, Hymenoptera and Isoptera and other invertebrate pests such as acarine, nematode and mollusc pests.

The pests and pathogens which may be controlled by the use of the invention compositions include those pests and pathogens associated with agriculture, which term includes the growing of crops for food and fiber products. Compositions of the invention may be used for example on turf, ornamentals, such as flowers, shrubs, broad-leaved trees or evergreens, for example conifers, as well as for tree injection, pest management and the like.

Compositions of the invention may also be useful in the field of animal health, and may be used on an animal against microorganisms and parasitic invertebrate pests. Preferably, compositions of the invention are used against parasitic invertebrate pests on an animal. Examples of pests include nematodes, trematodes, cestodes, flies, mites, ticks, lice, fleas, chiggers, true bugs and maggots. The animal may be a non-human animal, e.g. an animal associated with agriculture, e.g. a cow, a pig, a sheep, a goat, a horse, or a donkey, or a companion animal, e.g. a dog or a cat.

Preferably, presently described compositions are used to control soft-bodied pests. Non-limiting examples of pest species which may be controlled by compositions of the present disclosure include: *Rhopalosiphum padi* (aphid), *Myzus persicae* (aphid), *Brevicoryne brassicae* (aphid), *Aphis gossypii* (aphid), *Aphisfabae* (aphid), *Lygus* spp. (capsids), *Dysdercus* spp. (capsids), *Nilaparvata lugens* (planthopper), *Nephotettixc incticeps* (leafhopper), *Nezara* spp. (stinkbugs), *Euschistus* spp. (stinkbugs), *Leptocorisa* spp. (stinkbugs), *Frankliniella occidentalis* (thrip), *Thrips* spp. (thrips), *Leptinotarsa decemlineata* (Colorado potato beetle), *Meligethes aeneus* (pollen beetle), *Anthonomus grandis* (boll weevil), *Aonidiella* spp. (scale insects), *Parthenolecanium pomeranicum* (scale insects), *Trialeurodes* spp. (white flies), *Bemisia tabaci* (white fly), *Ostrinia nubilalis* (European corn borer), *Spodoptera littoralis* (cotton leafworm), *Heliothis virescens* (tobacco budworm), *Helicoverpa armigera* (cotton bollworm), *Helicoverpa zea* (cotton bollworm), *Sylepta derogata* (cotton leaf roller), *Pieris brassicae* (white butterfly), *Plutella xylostella* (diamond back moth), *Agrotis* spp. (cutworms), *Chilo suppressalis* (rice stem borer), *Locusta migratoria* (locust), *Chortiocetes terminifera* (locust), *Diabrotica* spp. (rootworms), *Panonychus ulmi* (European red mite), *Panonychus citri* (citrus red mite), *Tetranychus urticae* (two-spotted spider mite), *Tetranychus cinnabarinus* (carmine spider mite), *Phyllocoptruta oleivora* (citrus rust mite), *Polyphagotarsonemus latus* (broad mite), *Brevipalpus* spp. (flat mites), *Varroa destructor* (varroa mites), *Boophilus microplus* (cattle tick), *Dermacentor variabilis* (American dog tick), *Ctenocephalidesfelis* (cat flea), *Liriomyza* spp. (leafminer), *Musca domestica* (housefly), *Aedes aegypti* (mosquito), *Anopheles* spp. (mosquitoes), *Culex* spp. (mosquitoes), *Lucillia* spp. (blowflies), *Blattella germanica* (cockroach), *Periplaneta americana*

(cockroach), *Blatta orientalis* (cockroach), termites of the *Mastotermitidae* (for example *Mastotermes* spp.), the *Kalotermitidae* (for example *Neotermes* spp.), the *Rhinotermitidae* (for example *Coptotermes formosanus*, *Reticulitermes flavipes*, *R. speratu*, *R. virginicus*, *R. hesperus*, and *R. santonensis*) and the *Termitidae* (for example *Globitermes sulfureus*), *Solenopsis geminata* (fire ant), *Monomorium pharaonis* (pharaoh's ant), *Damalinia* spp. and *Linognathus* spp. (biting and sucking lice), *Meloidogyne* spp. (root knot nematodes), *Globodera* spp. and *Heterodera* spp. (cyst nematodes), *Pratylenchus* spp. (lesion nematodes), *Rhodopholus* spp. (banana burrowing nematodes), *Tylenchulus* spp. (citrus nematodes), *Haemonchus contortus* (barber pole worm), *Caenorhabditis elegans* (vinegar eelworm), *Trichostrongylus* spp. (gastro intestinal nematodes) *Deroceras reticulatum* (slug), *Haematobia* (Lyperosia) *irritans* (horn fly), *Dermanyssus galinae* (poultry red mite), *Simulium* spp. (blackfly), *Glossina* spp. (tsetse flies), *Hydrotaea irritans* (head fly), *Musca autumnalis* (face fly), *Musca domestica* (house fly), *Morellia simplex* (sweat fly), *Tabanus* spp. (horse fly), *Hypoderma bovis*, *Hypoderma lineatum*, *Lucilia sericata*, *Lucilia cuprina* (green blowfly), *Calliphora* spp. (blowfly), *Stomoxys calcitrans* (stable fly), *Protophormia* spp., *Oestrus ovis* (nasal botfly), *Culicoides* spp. (midges), *Chrysops* spp. (deer fly), *Hippobosca equine*, *Gastrophilus intestinalis*, *Gastrophilus haemorrhoidalis*, lice such as *Bovicola* (*Damalinia*) *bovis*, *Bovicola equi*, *Haematopinus asini*, *Felicola subrostratus*, *Heterodoxus spiniger*, *Lignonathus setosus* and *Trichodectes canis*, keds such as *Melophagus ovinus*, and mites such as *Psoroptes* spp., *Sarcoptes scabei*, *Chorioptes bovis*, *Demodex equi*, *Cheyletiella* spp., *Notoedres cati*, *Trombicula* spp. and *Otodectes cyanotis* (ear mites), ticks such as *Argasidae* spp., *Argalphas* spp., and *Ornithodoros* spp., *Ixodidae* spp., *Rhipicephalphalus sanguineus*, *Dermacentor variabilis*, *Dermacentor andersoni*, *Amblyomma americanum*, *Ixodes scapularis* and other *Rhipicephalus* spp., b. Formulation Compositions of the present disclosure may be formulated for application to animals or to plants. Formulation types may include dustable powders (DP), soluble powders (SP), water soluble granules (SG), water dispersible granules (WG), wettable powders (WP), granules (GR) (slow or fast release), soluble concentrates (SL), oil miscible liquids (OL), ultra-low volume liquids (UL), emulsifiable concentrates (EC), dispersible concentrates (DC), emulsions (both oil in water (EW) and water in oil (EO)), micro-emulsions (ME), suspension concentrates (SC), aerosols, fogging/smoke formulations, capsule suspensions (CS) and seed treatment formulations. The formulation type chosen in any instance will depend upon the particular purpose envisaged and the physical, chemical and biological properties of a composition.

Dustable powders (DP) may be prepared by mixing a composition of the disclosure with one or more solid diluents such as natural clays, kaolin, pyrophyllite, bentonite, alumina, montmorillonite, kieselguhr, chalk, diatomaceous earths, calcium phosphates, calcium and magnesium carbonates, sulfur, lime, flours, talc and other organic and inorganic solid carriers, and mechanically grinding the mixture to a fine powder.

Soluble powders (SP) may be prepared by mixing a composition of the disclosure with one or more wetting agents, one or more dispersing agents, one or more anti-caking agents, one or more free-flow aids, one or more water soluble sugars, or a mixture of said agents to improve water dispersibility/solubility. The mixture is then ground to a fine powder. Similar compositions may also be granulated to form water soluble granules (SG) for instance, by using a roll-pressing granulator.

Wettable powders (WP) may be prepared by mixing a composition of the disclosure with one or more solid diluents or carriers, one or more wetting agents and, preferably, one or more dispersing agents and, optionally, one or more suspending agents to facilitate the dispersion in liquids. The mixture is then ground to a fine powder. Similar compositions may also be granulated to form water dispersible granules (WG).

Granules (GR) may be formed either by granulating a mixture of a composition of the disclosure and one or more powdered solid diluents or carriers, or from pre-formed blank granules by absorbing a composition of the disclosure in a porous granular material (such as pumice, attapulgite clays, fuller's earth, kieselguhr, diatomaceous earths or ground corn cobs) or by adsorbing a composition of the disclosure (or a solution thereof, in a suitable agent) on to a hard core material (such as sands, silicates, mineral carbonates, sulfates or phosphates) and drying if necessary. Agents which are commonly used to aid absorption or adsorption include solvents (such as aliphatic and aromatic petroleum solvents, alcohols, ethers, ketones and esters) and sticking agents (such as polyvinyl acetates, polyvinyl alcohols, dextrins, sugars and vegetable oils). One or more other additives may also be included in granules (for example an emulsifying agent, wetting agent or dispersing agent).

Dispersible Concentrates (DC) may be prepared by dissolving a composition of the disclosure in water or an organic solvent, such as a ketone, alcohol or glycol ether. These solutions may contain a surface active agent (for example to improve water dilution or prevent crystallization in a spray tank).

Emulsifiable concentrates (EC) or oil-in-water emulsions (EW) may be prepared by dissolving a composition of the disclosure in an organic solvent. Suitable organic solvents for use in ECs include aromatic hydrocarbons such as alkylbenzenes or alkylnaphthalenes, ketones such as cyclohexanone or methylcyclohexanone, dimethyl amides of fatty acids such as C8-C10 fatty acid dimethylamide, N-alkylpyrrolidones such as N-methylpyrrolidone or N-octylpyrrolidone, chlorinated hydrocarbons, and alcohols such as ethanol, propanol, isopropanol, isopentane, n-pentane, n.hexane, dimethoxymethane, benzyl alcohol, benzyloxyethanol, alkylene carbonates such as ethylene carbonate and propylene carbonate, phenoxyethanol, butanol, isobutanol, cyclohexane, cyclohexanol, ethylenecarbonate, 1-phenylethylalcohol, 2-phenylethylalcohol, o-methoxyphenol and glycol ethers. Preferred organic solvents are glycol ethers. Non-limiting examples of glycol ethers include ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether, ethylene glycol dimethyl ether, ethylene glycol diethyl ether, ethylene glycol dibutyl ether, ethylene glycol methyl ether acetate, ethylene glycol monoethyl ether acetate, ethylene glycol monobutyl ether acetate, propylene glycol methyl ether acetate, and dipropylene glycol methyl ether. A preferred glycol ether solvent is dipropylene glycol methyl ether. An EC product may spontaneously emulsify on addition to water, to produce an emulsion with sufficient stability to allow spray application through appropriate equipment.

Microemulsions (ME) may be prepared by mixing water with a blend of one or more solvents with one or more surfactants, to spontaneously produce a thermodynamically stable isotropic liquid formulation. A composition of the disclosure is present initially in either the water or the solvent/surfactant blend. Suitable solvents for use in MEs include those hereinbefore described for use in ECs or in EWs. An ME may be either an oil-in-water (EW) or a water-in-oil (EO) system and may be suitable for mixing water-soluble and oil-soluble pesticides in the same formulation. An ME is suitable for dilution into water, either remaining as a microemulsion or forming an oil-in-water emulsion.

Suspension concentrates (SC) may comprise aqueous or non-aqueous suspensions of finely divided insoluble solid particles of a composition of the disclosure. One or more wetting agents may be included in the composition and a suspending agent may be included to reduce the rate at which the particles settle.

Formulations may also contain formulation auxiliaries and additives, known to those skilled in the art as formulation aids (some of which may be considered to also function as solid diluents, liquid diluents or surfactants). Such formulation auxiliaries and additives may control: pH (buffers), foaming during processing (antifoams such as polyorganosiloxanes), sedimentation of active ingredients (suspending agents), viscosity (thixotropic thickeners), in-container microbial growth (antimicrobials), product freezing (antifreezes), color (dyes/pigment dispersions), evaporation (evaporation retardants), and other formulation attributes. Examples of formulation auxiliaries and additives include those listed in McCutcheon's Volume 2: Functional Materials, annual International and North American editions published by McCutcheon's Division, The Manufacturing Confectioner Publishing Co.; and PCT Publication WO 03/024222.

Compositions may be supplied in the form of a concentrate containing a high proportion of surfactants and matrix-forming agents, the concentrate being added to water before use. These concentrates, which may include DCs, SCs, ECs, EWs, MEs such as EWs and EOs, SGs, SPs, WPs, WGs and CSs, are often required to withstand storage for prolonged periods and, after such storage, to be capable of addition to water to form aqueous preparations which remain homogeneous for a sufficient time to enable them to be applied by conventional spray equipment.

c. Application

A composition of the disclosure may be applied by any of the known methods of applying pesticidal compounds. For example, when applied to an animal, a composition may be applied to pests on an animal or to a locus of the pests on an animal or to any part of an animal. When applied to a plant, a composition may be applied to pests on a plant or to a locus of the pests or to any part of a plant, including the foliage, stems, branches or roots, to the seed before it is planted or to other media in which plants are growing or are to be planted (such as soil surrounding the roots, the soil generally, paddy water or hydroponic culture systems). Compositions according to the disclosure are suitable for spot-on, shampoo formulations, or applied as a cream or paste formulations for use on animals, or dipping, pour-on or spray application on animals or plants where the spray application may be carried out, for example, using a pump spray or an aerosol spray (pressurized spray).

Compositions of the disclosure may also be applied with other compounds having biological activity, for example micronutrients or compounds having fungicidal activity or which possess growth regulating, herbicidal, insecticidal, nematicidal or acaricidal activity. Other compounds having biological activity may provide a composition having a broader spectrum of activity or increased persistence at a locus; synergize the activity or complement the activity (for example by increasing the speed of effect or overcoming repellency) of presently described compositions; or help to overcome or prevent the development of resistance to individual components. The particular additional active ingredient will depend upon the intended utility of the composition.

When used on plants, preferred other compounds having biological activity include pesticides. Examples of suitable pesticides include the following:

a) Pyrethroids, such as permethrin, cypermethrin, fenvalerate, esfenvalerate, deltamethrin, cyhalothrin (in particular lambda-cyhalothrin), bifenthrin, fenpropathrin, cyfluthrin, tefluthrin, fish safe pyrethroids (for example ethofenprox), natural pyrethrin, tetramethrin, S-bioallethrin, fenfluthrin, prallethrin or 5-benzyl-3-furylmethyl-(E)-(1R,3S)-2,2-dimethyl-3-(2-oxothiolan-3-ylidenemethyl)cyclopropane carboxylate;

b) Organophosphates, such as profenofos, sulprofos, acephate, methyl parathion, azinphos-methyl, demeton-s-methyl, heptenophos, thiometon, fenamiphos, monocrotophos, profenofos, triazophos, methamidophos, dimethoate, phosphamidon, malathion, chlorpyrifos, phosalone, terbufos, fensulfothion, fonofos, phorate, phoxim, pirimiphos-methyl, pirimiphos-ethyl, fenitrothion, fosthiazate or diazinon;

c) Carbamates (including aryl carbamates), such as pirimicarb, triazamate, cloethocarb, carbofuran, furathiocarb, ethiofencarb, aldicarb, thiofurox, carbosulfan, bendiocarb, fenobucarb, propoxur, methomyl or oxamyl;

d) Benzoyl ureas, such as diflubenzuron, triflumuron, hexaflumuron, flufenoxuron or chlorfluazuron;

e) Organic tin compounds, such as cyhexatin, fenbutatin oxide or azocyclotin;

f) Pyrazoles, such as tebufenpyrad and fenpyroximate;

g) Macrolides, such as avermectins or milbemycins, for example abamectin, emamectin benzoate, ivermectin, milbemycin, spinosad, azadirachtin or spinetoram;

h) Hormones or pheromones;

i) Organochlorine compounds, such as endosulfan (in particular alpha-endosulfan), benzene hexachloride, DDT, chlordane or dieldrin;

j) Amidines, such as chlordimeform or amitraz;

k) Fumigant agents, such as chloropicrin, dichloropropane, methyl bromide or metam;

l) Neonicotinoid compounds, such as imidacloprid, thiacloprid, acetamiprid, nitenpyram, dinotefuran, thiamethoxam, clothianidin, nithiazine or flonicamid;

m) Diacylhydrazines, such as tebufenozide, chromafenozide or methoxyfenozide;

n) Diphenyl ethers, such as diofenolan or pyriproxifen;

o) Indoxacarb;

p) Chlorfenapyr;

q) Pymetrozine;

r) Spirotetramat, spirodiclofen or spiromesifen;

s) Diamides, such as flubendiamide, chlorantraniliprole or cyantraniliprole;

t) Sulfoxaflor;

u) Metaflumizone;

v) Fipronil and Ethiprole;
w) Pyrifluqinazon
x) buprofezin; or
y) 4-[(6-Chloro-pyridin-3-ylmethyl)-(2,2-difluoro-ethyl)-amino]-5H-furan-2-one (DE 102006015467).

In addition to the major chemical classes of pesticide listed above, other pesticides having particular targets may be employed in the composition, if appropriate for the intended utility of the composition. For instance, selective insecticides for particular crops, for example, stemborer specific insecticides such as cartap, or hopper specific insecticides such as buprofezin for use in rice, may be employed. Alternatively insecticides or acaricides specific for particular insect species/stages may also be included in the compositions (for example acaricidal ovo-larvicides, such as clofentezine, flubenzimine, hexythiazox or tetradifon; acaricidal motilicides, such as dicofol or propargite; acaricides, such as bromopropylate or chlorobenzilate; or growth regulators, such as hydramethylnon, cyromazine, methoprene, chlorfluazuron or diflubenzuron).

Other preferred compounds having biological activity include fungicides. Examples of fungicidal compounds which may be included in the composition of the invention are (E)-N-methyl-2-[2-(2,5-dimethylphenoxymethyl)phenyl]-2-methoxy-iminoacetamide (SSF-129), 4-bromo-2-cyano-N,N-dimethyl-6-trifluoromethylbenzimidazole-1-sulfonamide, α-[N-(3-chloro-2,6-xylyl)-2-methoxyacetamido]-γ-butyrolactone, 4-chloro-2-cyano-N,N-dimethyl-5-p-tolylimidazole-1-sulfonamide (IKF-916, cyamidazosulfamid), 3-5-dichloro-N-(3-chloro-1-ethyl-1-methyl-2-oxopropyl)-4-methylbenzamide (RH-7281, zoxamide), N-allyl-4,5,-dimethyl-2-trimethylsilylthiophene-3-carboxamide (MON65500), N-(1-cyano-1,2-dimethylpropyl)-2-(2,4-dichlorophenoxy)propionamide (AC382042), N-(2-methoxy-5-pyridyl)-cyclopropane carboxamide, acibenzolar (CGA245704), alanycarb, aldimorph, anilazine, azaconazole, azoxystrobin, benalaxyl, benomyl, biloxazol, bitertanol, blasticidin S, bromuconazole, bupirimate, captafol, captan, carbendazim, carbendazim chlorhydrate, carboxin, carpropamid, carvone, CGA41396, CGA41397, chinomethionate, chlorothalonil, chlorozolinate, clozylacon, copper containing compounds such as copper oxychloride, copper oxyquinolate, copper sulfate, copper tallate and Bordeaux mixture, cymoxanil, cyproconazole, cyprodinil, debacarb, di-2-pyridyl disulfide 1,1'-dioxide, dichlofluanid, diclomezine, dicloran, diethofencarb, difenoconazole, difenzoquat, diflumetorim, O,O-di-iso-propyl-5-benzyl thiophosphate, dimefluazole, dimetconazole, dimethomorph, dimethirimol, diniconazole, dinocap, dithianon, dodecyl dimethyl ammonium chloride, dodemorph, dodine, doguadine, edifenphos, epoxiconazole, ethirimol, ethyl-(Z)—N-benzyl-N-([methyl(methyl-thioethylideneamino-oxycarbonyl)amino]thio)-β-alaninate, etridiazole, famoxadone, fenamidone (RPA407213), fenarimol, fenbuconazole, fenfuram, fenhexamid (KBR2738), fenpiclonil, fenpropidin, fenpropimorph, fentin acetate, fentin hydroxide, ferbam, ferimzone, fluazinam, fludioxonil, flumetover, fluoroimide, fluquinconazole, flusilazole, flutolanil, flutriafol, folpet, fuberidazole, furalaxyl, furametpyr, guazatine, hexaconazole, hydroxyisoxazole, hymexazole, imazalil, imibenconazole, iminoctadine, iminoctadine triacetate, ipconazole, iprobenfos, iprodione, iprovalicarb (SZX0722), isopropanyl butyl carbamate, isoprothiolane, kasugamycin, kresoxim-methyl, LY186054, LY211795, LY248908, mancozeb, maneb, mefenoxam, mepanipyrim, mepronil, metalaxyl, metconazole, metiram, metiram-zinc, metominostrobin, myclobutanil, neoasozin, nickel dimethyldithiocarbamate, nitrothal-iso-propyl, nuarimol, ofurace, organomercury compounds, oxadixyl, oxasulfuron, oxolinic acid, oxpoconazole, oxycarboxin, pefurazoate, penconazole, pencycuron, phenazin oxide, phosetyl-A1, phosphorus acids, phthalide, picoxystrobin (ZA1963), polyoxin D, polyram, probenazole, prochloraz, procymidone, propamocarb, propiconazole, propineb, propionic acid, pyrazophos, pyrifenox, pyrimethanil, pyroquilon, pyroxyfur, pyrrolnitrin, quaternary ammonium compounds, quinomethionate, quinoxyfen, quintozene, sipconazole (F-155), sodium pentachlorophenate, spiroxamine, streptomycin, sulfur, tebuconazole, tecloftalam, tecnazene, tetraconazole, thiabendazole, thifluzamid, 2-(thiocyanomethylthio)benzothiazole, thiophanate-methyl, thiram, timibenconazole, tolclofos-methyl, tolylfluanid, triadimefon, triadimenol, triazbutil, triazoxide, tricyclazole, tridemorph, trifloxystrobin (CGA279202), triforine, triflumizole, triticonazole, validamycin A, vapam, vinclozolin, zineb, ziram; 1,3-Dimethyl-1H-pyrazole-4-carboxylic acid (4'-methylsulfanyl-biphenyl-2-yl)-amide, 1,3-Dimethyl-H-pyrazole-4-carboxylic acid (2-dichloromethylene-3-ethyl-1-methyl-indan-4-yl)-amide, and 1,3-Dimethyl-4H-pyrazole-4-carboxylic acid [2-(2,4-dichloro-phenyl)-2-methoxy-1-methyl-ethyl]-amide.

The compounds of formula (I) may be mixed with soil, peat or other rooting media for the protection of plants against seed-borne, soil-borne or foliar fungal pathogens.

When used in combination with other active ingredients on plants, compositions of the invention are preferably used in combination with a pyrethroid such as lambda-cyhalothrin. Compositions of the invention are preferably used in combination with an insecticide synergist. Insecticide synergists generally block the metabolic systems that would otherwise break down insecticide molecules, thereby increasing the efficiency of a pesticide in a formulation. Non-limiting examples of synergists include piperonyl butoxide, N-octyl bicycloheptene dicarboximide (MGK-264), S-421, sesamex, safroxan and dodecyl imidazole. More preferably, compositions of the invention may be used in combination with lambda-cyhalothrin and a synergist. More preferably, when used in combination with other active ingredients on plants, compositions of the invention are ECs comprising trisiloxane surfactants and sol-gel precursors as described in Section IbA, and further comprise lambda-cyhalothrin and piperonyl butoxide.

Still other preferred compounds having biological activity include herbicides. Suitable herbicides and plant-growth regulators for inclusion in the compositions will depend upon the intended target and the effect required.

When used on animals, preferred other compounds having biological activity may include anthelmintic agents. Such anthelmintic agents include, compounds selected from the macrocyclic lactone class of compounds such as ivermectin, avermectin, abamectin, emamectin, eprinomectin, doramectin, selamectin, moxidectin, nemadectin and milbemycin derivatives as described in EP-357460, EP-444964 and EP-594291. Additional anthelmintic agents include semisynthetic and biosynthetic avermectin/milbemycin derivatives such as those described in U.S. Pat. No. 5,015,630, WO-9415944 and WO-9522552. Additional anthelmintic agents include the benzimidazoles such as albendazole, cambendazole, fenbendazole, flubendazole, mebendazole, oxfendazole, oxibendazole, parbendazole, and other members of the class. Additional anthelmintic agents include imidazothiazoles and tetrahydropyrimidines such as tetramisole, levamisole, pyrantel pamoate, oxantel or morantel. Additional anthelmintic agents include flukicides, such as triclabendazole and clorsulon and the cestocides, such as praziquantel and epsiprantel.

Other preferred compounds having biological activity on an animal may include other ectoparasiticides; for example, fipronil; pyrethroids; organophosphates; insect growth regulators such as lufenuron; ecdysone agonists such as tebufenozide and the like; neonicotinoids such as imidacloprid and the like. Other examples of such biologically active compounds include but are not restricted to the following:

Organophosphates: acephate, azamethiphos, azinphos-ethyl, azinphos-methyl, bromophos, bromophos-ethyl, cadusafos, chlorethoxyphos, chlorpyrifos, chlorfenvinphos, chlormephos, demeton, demeton-S-methyl, demeton-S-methyl sulphone, dialifos, diazinon, dichlorvos, dicrotophos, dimethoate, disulfoton, ethion, ethoprophos, etrimfos, famphur, fenamiphos, fenitrothion, fensulfothion, fenthion, flupyrazofos, fonofos, formothion, fosthiazate, heptenophos, isazophos, isothioate, isoxathion, malathion, methacriphos, methamidophos, methidathion, methyl-parathion, mevinphos, monocrotophos, naled, omethoate, oxydemeton-methyl, paraoxon, parathion, parathion-methyl, phenthoate, phosalone, phosfolan, phosphocarb, phosmet, phosphamidon, phorate, phoxim, pirimiphos, pirimiphos-methyl, profenofos, propaphos, proetamphos, prothiofos, pyraclofos, pyridapenthion, quinalphos, sulprophos, temephos, terbufos, tebupirimfos, tetrachlorvinphos, thimeton, triazophos, trichlorfon, vamidothion.

Carbamates: alanycarb, aldicarb, 2-sec-butylphenyl methylcarbamate, benfuracarb, carbaryl, carbofuran, carbosulfan, cloethocarb, ethiofencarb, fenoxycarb, fenthiocarb, furathiocarb, HCN-801, isoprocarb, indoxacarb, methiocarb, methomyl, 5-methyl-m-cumenylbutyryl(methyl)carbamate, oxamyl, pirimicarb, propoxur, thiodicarb, thiofanox, triazamate, UC-51717.

Pyrethroids: acrinathin, allethrin, alphametrin, 5-benzyl-3-furylmethyl(E)-(1R)-cis-2,2-dimethyl-3-(2-oxothiolan-3-ylidenemethyl)cyclopropanecarboxylate, bifenthrin, beta-cyfluthrin, cyfluthrin, a-cypermethrin, beta-cypermethrin, bioallethrin, bioallethrin((S)-cyclopentylisomer), bioresmethrin, bifenthrin, NCI-85193, cycloprothrin, cyhalothrin, cythithrin, cyphenothrin, deltamethrin, empenthrin, esfenvalerate, ethofenprox, fenfluthrin, fenpropathrin, fenvalerate, flucythrinate, flumethrin, fluvalinate (D isomer), imiprothrin, lambda-cyhalothrin, permethrin, phenothrin, prallethrin, pyrethrins (natural products), resmethrin, tetramethrin, transfluthrin, theta-cypermethrin, silafluofen, t-fluvalinate, tefluthrin, tralomethrin, Zeta-cypermethrin.

Arthropod growth regulators: a) chitin synthesis inhibitors: benzoylureas: chlorfluazuron, diflubenzuron, fluazuron, flucycloxuron, flufenoxuron, hexaflumuron, lufenuron, novaluron, teflubenzuron, triflumuron, buprofezin, diofenolan, hexythiazox, etoxazole, chlorfentazine; b) ecdysone antagonists: halofenozide, methoxyfenozide, tebufenozide; c) juvenoids: pyriproxyfen, methoprene (including S-methoprene), fenoxycarb; d) lipid biosynthesis inhibitors: spirodiclofen.

Other antiparasitics: acequinocyl, amitraz, AKD-1022, ANS-118, azadirachtin, *Bacillus thuringiensis*, bensultap, bifenazate, binapacryl, bromopropylate, BTG-504, BTG-505, camphechlor, cartap, chlorobenzilate, chlordimeform, chlorfenapyr, chromafenozide, clothianidine, cyromazine, diacloden, diafenthiuron, DBI-3204, dinactin, dihydroxymethyldihydroxypyrrolidine, dinobuton, dinocap, endosulfan, ethiprole, ethofenprox, fenazaquin, flumite, MTI-800, fenpyroximate, fluacrypyrim, flubenzimine, flubrocythrinate, flufenzine, flufenprox, fluproxyfen, halofenprox, hydramethylnon, IKI-220, kanemite, NC-196, neem guard, nidinorterfuran, nitenpyram, SD-35651, WL-108477, pirydaryl, propargite, protrifenbute, pymethrozine, pyridaben, pyrimidifen, NC-1111, R-195, RH-0345, RH-2485, RYI-210, S-1283, S-1833, SI-8601, silafluofen, silomadine, spinosad, tebufenpyrad, tetradifon, tetranactin, thiacloprid, thiocyclam, thiamethoxam, tolfenpyrad, triazamate, triethoxyspinosyn, trinactin, verbutin, vertalec, yl-5301.

Fungicides: acibenzolar, aldimorph, ampropylfos, andoprim, azaconazole, azoxystrobin, benalaxyl, benomyl, bialaphos, blasticidin-S, Bordeaux mixture, bromuconazole, bupirimate, carpropamid, captafol, captan, carbendazim, chlorfenazole, chloroneb, chloropicrin, chlorothalonil, chlozolinate, copper oxychloride, copper salts, cyflufenamid, cymoxanil, cyproconazole, cyprodinil, cyprofuram, RH-7281, diclocymet, diclobutrazole, diclomezine, dicloran, difenoconazole, RP-407213, dimethomorph, domoxystrobin, diniconazole, diniconazole-M, dodine, edifenphos, epoxiconazole, famoxadone, fenamidone, fenarimol, fenbuconazole, fencaramid, fenpiclonil, fenpropidin, fenpropimorph, fentin acetate, fluazinam, fludioxonil, flumetover, flumorf/flumorlin, fentin hydroxide, fluoxastrobin, fluquinconazole, flusilazole, flutolanil, flutriafol, folpet, fosetyl-aluminium, furalaxyl, furametapyr, hexaconazole, ipconazole, iprobenfos, iprodione, isoprothiolane, kasugamycin, krsoxim-methyl, mancozeb, maneb, mefenoxam, mepronil, metalaxyl, metconazole, metominostrobin/fenominostrobin, metrafenone, myclobutanil, neo-asozin, nicobifen, orysastrobin, oxadixyl, penconazole, pencycuron, probenazole, prochloraz, propamocarb, propiconazole, proquinazid, prothioconazole, pyrifenox, pyraclostrobin, pyrimethanil, pyroquilon, quinoxyfen, spiroxamine, sulfur, tebuconazole, tetrconazole, thiabendazole, thifluzamide, thiophanate-methyl, thiram, tiadinil, triadimefon, triadimenol, tricyclazole, trifloxystrobin, triticonazole, validamycin, vinclozin.

Biological agents: *Bacillus thuringiensis* ssp *aizawai*, kurstaki, *Bacillus thuringiensis* delta endotoxin, baculovirus, entomopathogenic bacteria, virus and fungi.

Bactericides: chlortetracycline, oxytetracycline, streptomycin.

Other biological agents: enrofloxacin, febantel, penethamate, moloxicam, cefalexin, kanamycin, pimobendan, clenbuterol, omeprazole, tiamulin, benazepril, pyriprole, cefquinome, florfenicol, buserelin, cefovecin, tulathromycin, ceftiour, carprofen, metaflumizone, praziquarantel, triclabendazole.

Examples

The following examples are included to demonstrate preferred embodiments of the invention. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1. Preparation and Efficacy of Pesticidal Composition Comprising Trisiloxane and Tetraethyl Orthosilicate A pesticidal composition was prepared by mixing the Silibase 2848 trisiloxane silicon surfactant with the gel-forming precursor tetraethyl orthosilicate (TEOS) to form an emulsifiable liquid concentrate (EC) composition comprising 99% Silibase 2848 and 1% TEOS. The EC composition was then diluted in water to generate a composition for spraying on plants or animals.

The efficacy of the prepared composition was evaluated against various plant pests (Tables 1-7). In short, plants infested with various pests were sprayed with the prepared diluted formulation, and % mortality of the pests was recorded.

TABLE 1

Efficacy against bird cherry oat aphid (*Rhopalosiphum padi*) on barley in the indoor pot test.

| | MORTALITY [%] | | |
|---|---|---|---|
| | Percentage by weight | 1 hour after treatment | 2 days after treatment |
| Control: Silibase 2848 | 0.15% | 80.2 | 92.4 |
| Composition according to the present Example 1 | 0.15% | 100 | 100 |

The results in Table 1 demonstrate that a composition comprising a trisiloxane surfactant with TEOS is more efficient at controlling pests when compared to a formulation comprising a similar amount of trisiloxane alone.

TABLE 2

Efficacy against red spider mite (*Tetranychus urticae*) on strawberry in field trials.

| | Control of larvae, nymphs and adults | |
|---|---|---|
| | 2 weeks after treatment | 4 weeks after treatment |
| Composition according to Example 1 (0.2%) | 96.3 | 81.0 |
| Positive control: fenpyroximate SC (1.25 l/ha) | 95.4 | 87.2 |

Application rate: 500 L/ha

TABLE 3

Efficacy against Black bean aphid (*Aphis fabae*) on beetroot in field trials.

| | 3 days after treatment | 7 days after treatment | 14 days after treatment |
|---|---|---|---|
| Composition according to Example 1 (0.1%) | 93.4 | 100 | 100 |
| Positive control: pirimicarb WG (0.35 kg/ha) | 98.7 | 100 | 100 |

Application rate: 500 L/ha

TABLE 4

Efficacy against cabbage aphid (*Brevicoryne brassicae*) on cabbage in field trials.

| | 3 days after treatment | 7 days after treatment | 14 days after treatment |
|---|---|---|---|
| Composition according to Example 1 (0.1%) | 92.6 | 100 | 100 |
| Positive control: pirimicarb WG (0.35 kg/ha) | 87.0 | 99.3 | 98.7 |

Application rate: 500 L/ha

TABLE 5

Efficacy against red spider mite (*Tetranychus urticae*) on chrysanthemum in greenhouse trials.

| | 3 days after treatment | 7 days after treatment |
|---|---|---|
| Composition according to Example 1 (0.2%) | 98.6 | 97.0 |
| Positive control: Abamectin 018EC (0.05%) | 0.0 | 93.6 |

Application rate: 500 L/ha

TABLE 6

Efficacy against common scale larvae (*Parthenolecanium pomeranicum*) on yew (Taxus) in field trial.

| | 3 days after treatment | 7 days after treatment | 14 days after treatment |
|---|---|---|---|
| Composition according to Example 1 0.2% | 92.3 | 98.7 | 92.2 |
| Positive control: Spirotetramat 100SC (0.075%) | 0.0 | 71.8 | 22.6 |

Application rate: 500 L/ha

TABLE 7

Efficacy against greenhouse whitefly (*Trialeurodes vaporariorum*) on gerbera in field trial.

| | 1 day after application | 3 days after application | 7 days after application |
|---|---|---|---|
| Composition according to Example 1 (0.2%) | 91.3% | 90.8% | 92.6% |
| Positive control: Imidacloprid 200 SL 0.08% | 94.9% | 93.6% | 93.8% |

The results in Tables 2-7 demonstrate that a composition as prepared in this Example is more efficient or at least as efficient at controlling various pests when compared to formulations comprising pesticides with mode of action other than a physical mode of action. In the case of red spider mites on *chrysanthemum* and common scale larvae on yew, the composition described herein was almost completely effective at killing the pests 3 days after treatment, whereas positive control formulations comprising conventional active agents such as Abamectin and Spirotetramat were not effective at all.

Tables 8-9 illustrate the efficacy of the prepared composition against various pests on animals. The composition according to Example 1 was sprayed as a prepared diluted formulation directly to the vent of infested birds. Each bird was scored for mites using visual and photographic methods, both pre- and post-treatment. Scoring was conducted on the following scale:
 0: 0 mites
 1: 1-10 mites
 2: 11-100 mites
 3: >100 mites

TABLE 8

Efficacy against northern fowl mite (*Ornithonyssus sylviarum*) in deep litter housing system.

| Treatment | Percentage by weight | Day 0 (treatment) | 7 DAT |
|---|---|---|---|
| Composition according to Example 1 - BIRD 1 | 0.3% | 3 | 0 |
| Composition according to Example 1 - BIRD 2 | 0.3% | 2 | 0 |
| Composition according to Example 1 - BIRD 3 | 0.3% | 2 | 0 |
| Composition according to Example 1 - BIRD 4 | 0.3% | 3 | 0 |
| Control - BIRD 1 | — | 2 | 1 |
| Control - BIRD 2 | — | 2 | 2 |
| Control - BIRD 3 | — | 1 | 2 |
| Control - BIRD 4 | — | 3 | 2 |

DAT: days after treatment

The results in Table 8 illustrate that a composition according to Example 1 was more effective or at least as effective at controlling various pests when compared to formulations comprising pesticides with mode of action other than a physical mode of action.

TABLE 9

Efficacy against red poultry mite (*Dermanyssus gallinae*) in battery cage housing system.

| Treatment | Percentage by weight | 5 DAT (treatment) | 10 DAT (re-treated after 5 days) |
|---|---|---|---|
| Composition according to Example 1 | 0.6% | 70% | 85% |
| Control untreated | — | 0% | 0% |

DAT: days after treatment

The results in Table 9 demonstrate that a composition according to Example 1 is very effective in controlling red poultry mites when applied to typical hiding places, where mites aggregate (cracks, crevices and hollow places (e.g. in troughs and feeders, walls, floors, etc.).

Example 2. Preparation and Determination of Efficacy of Pesticidal Composition Comprising a Synergist in Addition to Trisiloxane and TEOS A pesticidal composition was prepared by mixing the composition described in Example 1 with the synergist piperonyl butoxide (PBO) to form a composition comprising 90% of the composition of Example 1, and 10% PBO.

The resulting composition was prepared for administration onto plants by mixing 0.4 liters of the composition and 0.12 liters of the pyrethroid pesticide Karate Zeon 050 CS in 200 liters of water. A control formulation comprising only 0.12 liters of the pyrethroid pesticide Karate Zeon 050 CS in 200 liters of water was also prepared for comparison. The efficacy of the resulting spray formulations was evaluated against pollen beetle (*Meligethes aeneus*) on spring oilseed rape (Table 10). In short, plants infested with pollen beetle were sprayed with the prepared formulations, and % mortality of the pests was recorded.

TABLE 10

Efficacy against pollen beetle (*Meligethes aeneus*) on Spring oilseed rape.

| | Mortality [%] | | |
|---|---|---|---|
| Formulation | 2 days after treatment | 4 days after treatment | 6 days after treatment |
| Control: Karate Zeon 050CS | 69.31 | 68.57 | 53.65 |
| Karate Zeon 050CS + Composition according to Example 2 | 87.15 | 83.26 | 69.18 |

The results in Table 10 demonstrate that a composition as prepared in this Example is more efficient at controlling pests when compared to formulations comprising the pesticide alone.

Example 3. Preparation and Determination of Efficacy of Pesticidal Composition Comprising Insecticides in Addition to Trisiloxane and TEOS A pesticidal composition was prepared by mixing the composition described in Example 1 with a ready-to-use solution of microcapsulated lambda-cyhalothrin and fipronil. The resulting composition was prepared for administration onto a bed frame by mixing 2 ml of the composition described in Example 1 and 1.0 liter microcapsulated lambda-cyhalothrin and fipronil spray solution (0.1%).

A control formulation comprising 1.0 liter microcapsulated lambda-cyhalothrin and fipronil spray solution (0.1%) was also prepared for comparison as the control. The efficacy of the resulting spray formulations was evaluated on bed bugs (*Cimex lectularius*)—males, females, strain resistant to pyrethroids (Table 11). In short, bed frames of infested beds were sprayed with the prepared formulations and % of mortality of the pests was recorded.

TABLE 11

Efficacy against bed bugs (*Cimex lectularius*) when applied to bed frame.

| | Mortality [%] | | |
|---|---|---|---|
| Formulation | Immediately after treatment | 24 hours after treatment | 48 hours after treatment |
| Control: 0.1% spray solution of capsulated lambda-cyhalothrin and fipronil. | 0% | 15% | 55% |
| 0.1% spray solution of capsulated lambda-cyhalothrin and fipronil + 0.2% Composition according to Example 1 | 100% | 100% | 99% |

The results in Table 11 demonstrate that a composition as prepared in this Example is more efficient at controlling pest populations harboring in inaccessible locations, when compared to formulations comprising the pesticide alone.

Example 4. Preparation and Determination of Efficacy of Pesticidal Composition Comprising Trisiloxane and Chitosan An oil-in-water emulsifiable concentrate (EW; also known as an oil dispersion (OD)) of chitosan acetate (47 kDa, 88% DDA) with silicone surfactant was prepared as follows. 15.0 grams of chitosan was dispersed in 45 grams of dipropylene glycol methyl ether using IKA Ultra Turrax T18 high-shear mixer. 15 grams of 50% acetic acid was then added to the resulting mixture, mixed for 10 minutes and then cooled. 25 grams of trisiloxane surfactant (Break-Thru S240) was then added and mixed until a dispersion was obtained. The composition was diluted to a concentration of 0.1% in water at pH 7.5, or water acidified with acetic acid to pH 3.5 before treatment. Efficacy against rose aphid (*Macrosiphum rosae*) was determined in greenhouse trials (Table 12).

TABLE 12

Efficacy against rose aphid (*Macrosiphum rosae*).

| | Mortality [%] | | | | | |
|---|---|---|---|---|---|---|
| pH | DAT 1 | DAT 3 | DAT 7 | DAT 14 | DAT 21 | DAT 28 |
| 3.5 | 93.3 | 100 | 100 | 100 | 100 | 100 |
| 7.5 | 77.7 | 93.3 | 91.6 | 78.4 | 67.9 | 56.5 |

DAT: days after treatment

The results in Table 12 demonstrate that a composition as prepared in this Example is more efficient at controlling pests when prepared in acidified water when compared to formulations prepared in water at a neutral pH.

Example 4. Preparation of Soluble Powder Formulations of Pesticidal Compositions Comprising Trisiloxane and Chitosan Soluble powder (SP) formulations comprising trisiloxane and chitosan acetate (47 kDa, 88% DDA) were prepared as described in Table 13.

TABLE 13

Soluble powder formulations of compositions comprising trisiloxane and chitosan.

| | Component (%) | | | | | |
|---|---|---|---|---|---|---|
| Example No. | Silicone surfactant SILWET L-77 | Chitosan (47 kDa, 88% DDA) | Chitosan propionate | Tixosil 38A silica | Citric acid | Propionic acid |
| 1 | 25 | 25 | — | 9 | 41 | — |
| 2 | 25 | — | 25 | 35 | — | 15 |

SP formulations described herein are converted into gel by mixing the soluble powder with water at a ratio of 1:10, and mixing for 5 minutes. After 5 minutes of mixing, the gel is diluted with water to a final concentration of 0.1-0.2%.

Example 5. Preparation and Determination of Efficacy of Pesticidal Emulsion Concentrate Comprising Trisiloxane and Tetraethyl Orthosilicate with Pyriproxyfen A pesticidal composition can be prepared by mixing a trisiloxane silicone surfactant with TEOS and pyriproxyfen to form an emulsifiable liquid concentrate (EC) as set forth in Table 14. The EC composition can then be diluted in water to generate a composition comprising about 0.1-0.2% trisiloxane silicone surfactant for spraying on plants.

TABLE 14

| Pesticidal composition | |
|---|---|
| Ingredient | Concentration (%) |
| Pyriproxyfen 98% | 2.5% w/w |
| $C_{12-15}$ Alkyl Benzoate | 6.0% w/w |
| TEOS | 0.1% w/w |
| Silwet 408 | 91.4% w/w |

The foregoing merely illustrates the principles of the disclosure. Various modifications and alterations to the described embodiments will be apparent to those skilled in the art in view of the teachings herein. It will thus be appreciated that those skilled in the art will be able to devise numerous compositions and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A water emulsifiable or soluble pesticidal composition comprising at least one trisiloxane surfactant and having a physical pesticidal mode of action, the composition comprising:

a. at least one trisiloxane surfactant having Formula (I):

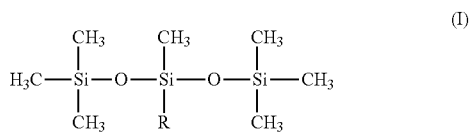

wherein
R is —(CH$_2$)$_3$—(OCH$_2$CH$_2$)nOR$_1$;
R$_1$ is —H, —CH$_3$, or —O(O)CCH$_3$; and
n is 2 to 20.
b. a gel matrix-forming agent in a form of at least one of a silicon alkoxide or titanium alkoxide sol-gel precursor,
wherein the relative amount by weight of the at least one trisiloxane surfactant to the at least one silicon alkoxide or titanium alkoxide sol-gel precursor is at least 18:1; and
wherein the composition forms a lasting gel matrix when applied to a surface of a pest; and
wherein the trisiloxane surfactant enhances the spreading of the composition on the surface of the pest, and the physical pesticidal mode of action comprises the composition spreading over the surface of the pest and forming the lasting gel matrix thereon.

2. The composition of claim 1, wherein the at least one trisiloxane surfactant is present in the amount of about 95% to about 99.9% (wt/wt).

3. The composition of claim 1, wherein the at least one trisiloxane surfactant is selected from the group consisting of Silwet L-77, Silwet 408, Break-Thru S-240, Silibase 2848, and combinations thereof.

4. The composition of claim 2, wherein the at least one sol-gel precursor is present in an amount of about 0.1% to about 5% (wt/wt).

5. The composition of claim 1, wherein the at least one sol-gel precursor is selected from the group consisting of tetraethyl orthosilicate, tramethyl orthosilicate, and combinations thereof.

6. The composition of claim 5, wherein the sol-gel precursor is tetraethyl orthosilicate.

7. The composition of claim 6, wherein the at least one trisiloxane surfactant is present in an amount of about 99% (wt/wt), and tetraethyl orthosilicate is present in an amount of about 1% (wt/wt).

8. The composition of claim 1, wherein the composition further comprises a pesticide.

9. The composition of claim 1, wherein the composition further comprises an insecticide synergist selected from the group consisting of piperonyl butoxide, N-octyl bicycloheptene dicarboximide (MGK-264), S-421, sesamex, safroxan, dodecyl imidazole, and combinations thereof.

10. The composition of claim 9, wherein the insecticide synergist is piperonyl butoxide.

11. A method of applying the composition of claim 1, the method comprising diluting the composition in water to generate a diluted pesticidal composition comprising between about 0.01% to about 4% (wt/wt) trisiloxane surfactant, and applying the diluted composition to a surface.

* * * * *